United States Patent [19]

Sieren

[11] Patent Number: 4,458,774

[45] Date of Patent: Jul. 10, 1984

[54] SIDE PANEL LATCH FOR ENGINE HOOD

[75] Inventor: Gerald E. Sieren, Greendale, Wis.

[73] Assignee: Allis-Chalmers Corporation, Milwaukee, Wis.

[21] Appl. No.: 335,594

[22] Filed: Dec. 30, 1981

[51] Int. Cl.[3] .............................................. B62D 25/10

[52] U.S. Cl. ................................ 180/69.2; 180/89.17; 292/120; 292/DIG. 14

[58] Field of Search .......................... 180/69 R, 89.17; 292/DIG. 14, 120, 116, 213; 49/394

[56] References Cited

U.S. PATENT DOCUMENTS

| | | | |
|---|---|---|---|
| 1,346,325 | 7/1920 | McKinley | 180/69.2 |
| 1,778,474 | 10/1930 | Wiley | 292/DIG. 14 |
| 1,815,540 | 7/1931 | Black | 292/DIG. 14 |
| 1,824,895 | 9/1931 | Hynes | 292/DIG. 14 |
| 3,433,518 | 3/1969 | Foltz | 292/235 |
| 3,918,540 | 11/1975 | Haupt | 180/69 R |

FOREIGN PATENT DOCUMENTS

| | | | |
|---|---|---|---|
| 1272641 | 5/1972 | United Kingdom | 292/DIG. 14 |

*Primary Examiner*—David M. Mitchell
*Assistant Examiner*—Joseph G. McCarthy
*Attorney, Agent, or Firm*—Arthur L. Nelson

[57] ABSTRACT

A side panel latch for an engine hood on a tractor having vertical and horizontal adjustment to assure accurate panel fit and reliability of the latch operation.

9 Claims, 5 Drawing Figures

SIDE PANEL LATCH FOR ENGINE HOOD

This invention relates to an engine hood for a tractor and more particularly to a side panel latch and side panel mounted on the tractor with adjustable means for the panel and latch to assure positive operation and good reliability of the panel and latch.

The side panels of an engine hood on a motor vehicle are generally pivotally or slidably supported. Some panels are removable to provide better access for repair or servicing of the engine. The panel in its operating position must have the proper alignment with a grille and cab as well as the panel hanger structure and the latch which retains the panel in its operating position. The Haupt patent, U.S. Pat. No. 3,918,540, shows a side panel removably mounted on a hanger structure. The disclosure does not show any panel adjustment or any adjustment on the latching means as set forth in the applicant's invention. Accordingly, the applicant's invention provides adjustment of the side panel and the latch to assure the proper fit of the side panel on the engine hood and also the latch which engages a latch bar on the side panel. This assures good alignment between the side panel and the grille and cab and a positive operating latch mechanism to assure good reliability.

It is an object of this invention to provide a side panel latch for an engine hood on a motor vehicle.

It is another object of this invention to provide an adjustable side panel latch for a side panel of an engine hood to avoid strain between the latch and side panel.

It is a further object of this invention to provide an adjustable side panel latch and an adjustably mounted side panel for an engine hood on a motor vehicle to assure proper alignment of the panel and positive connection of the side panel latch to assure reliability in operation.

The objects of this invention are accomplished by providing a side panel which is supported on a hanger structure on the center portion of the engine hood. The hanger structure is adjustably supported to align the side panel with a grille and cab and the shroud on the motor vehicle. The latch is supported on the vehicle chassis and can also be adjusted for proper alignment for engaging a latch bar on the side panel. By providing the alignment of the side panel hanger structure, the side panel can be hung without any strain on the panel. The side panel latch in turn can be adjusted for proper alignment with the latch bar on the side panel to prevent any strain on the latch or panel when it is latched to the panel. Accordingly, this assures a more positive operation of the latch and alignment of the components related to the side panel to assure reliability of the device.

Referring to the drawings the preferred embodiment of this invention is illustrated.

Figure 4:
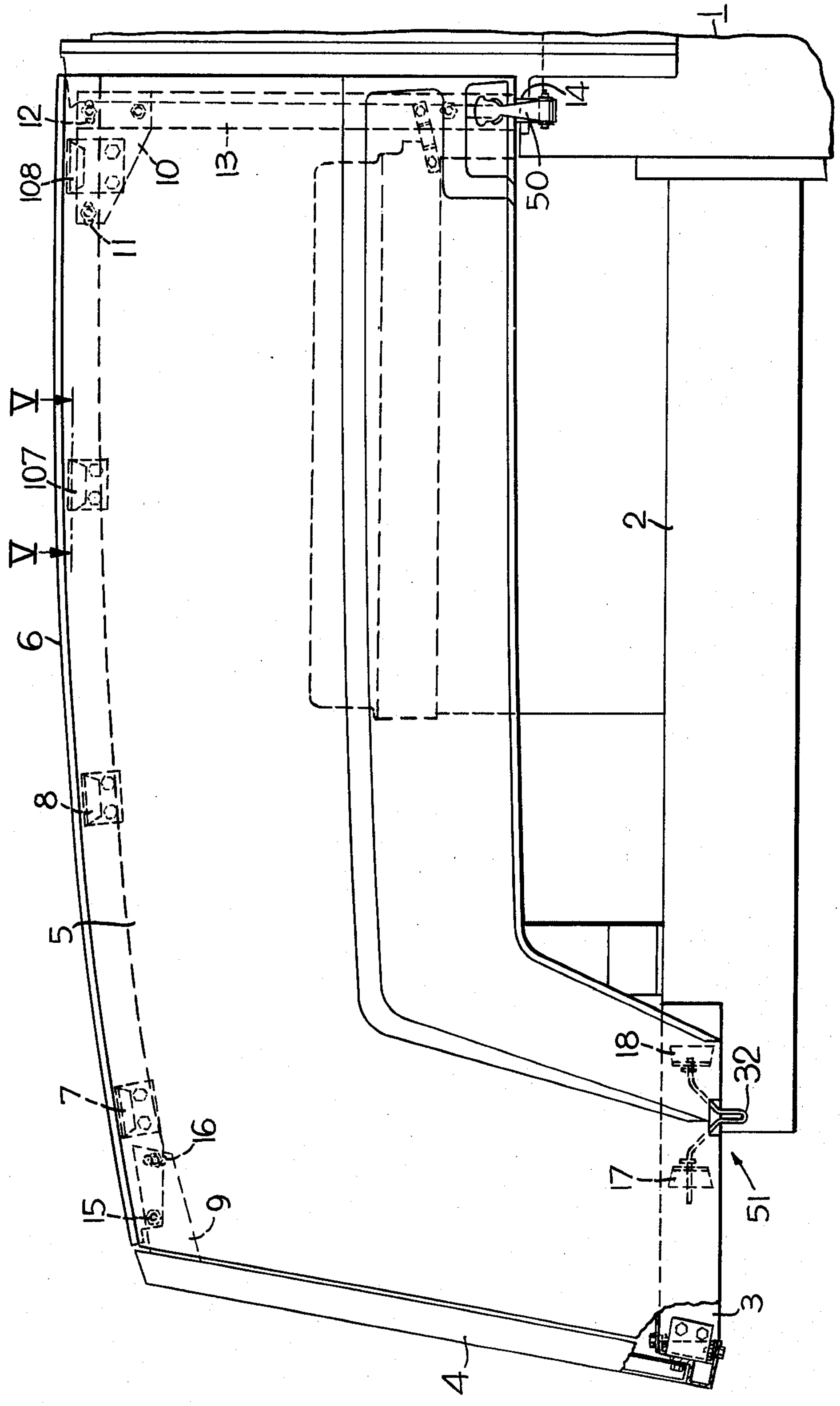
FIG. 4 is a side view of the side panel together with the hanger structure and the support on the vehicle chassis as well as the grille.

Referring to the drawings, the vehicle chassis 1, includes the frame 2 and the extension of the frame 3. The grille 4 is mounted on the forward end of the frame extension 3 and is mounted adjacent the side panel 5. The side panel 5 extends rearwardly to form the side of the engine hood. Referring to FIG. 4, the panel hanger structure 6 is shown supporting the side panel 5 through the hanger brackets 7, 8, 107, 108. The hanger structure 6 is fastened to the grille bracket 9 which adjustably positions the angle of the grille 4 relative to the side panel 5. Fore and aft adjustment is provided between the bracket 10 and hanger structure 6 by means of the horizontal slots 11, 12 on the bracket 10. This also adjusts the side panel 5 relative to the chassis. The support bracket 13 is mounted on the support 14 which is carried on the chassis. The grille bracket 9 is pivoted on the bolt 15 and by means of the slot 16 which will accommodate pivotal movement of the grille 4 relative to the side panel.

Figure 3:
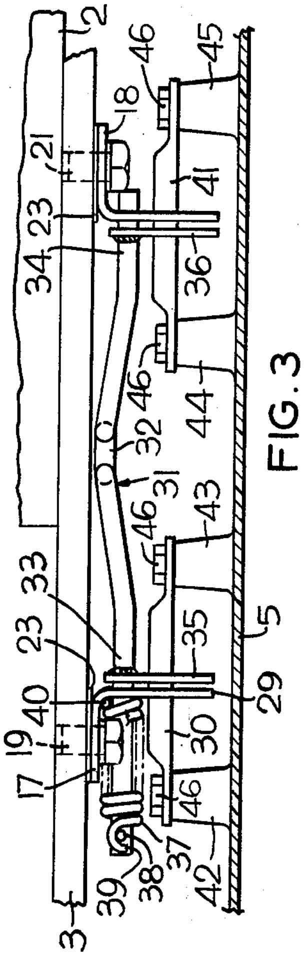
FIG. 3 is a plan view of the side panel and latching mechanism.
Figure 1:
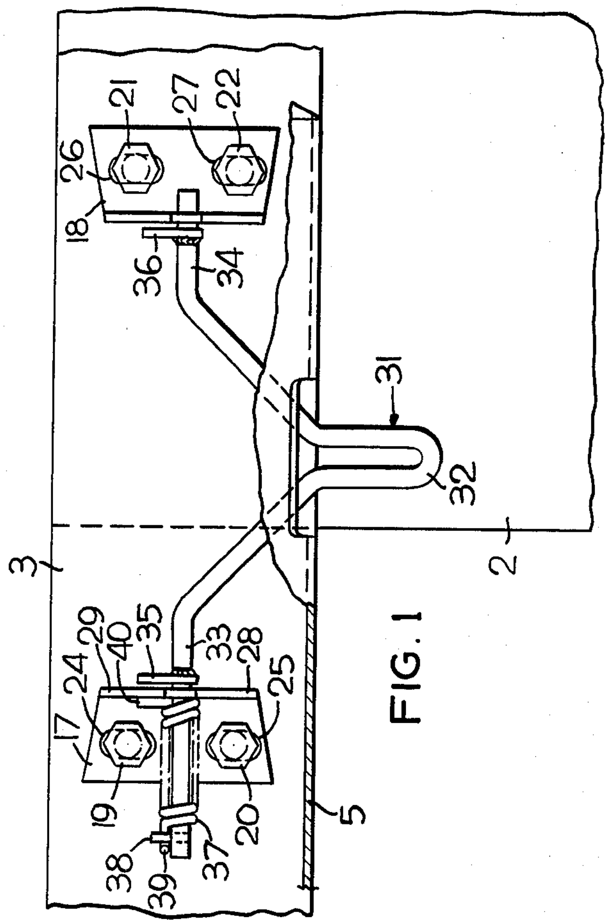
FIG. 1 is a side elevation view of the latching mechanism and the side panel.
Figure 5:
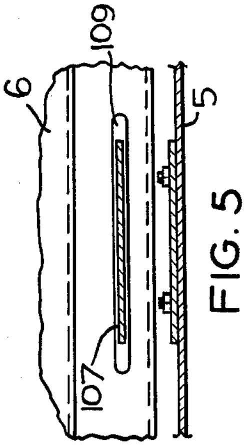
FIG. 5 is a cross-section view taken on line V—V of FIG. 4.

The latch brackets 17, 18 are supported by means of the bolts 19, 20, 21, 22. Each of the latch brackets is supported on a shim 23 as indicated in FIG. 3. Each of the brackets is also formed with vertical slots 24, 25 or 26, 27 to allow vertical adjustment of the latch mechanism. Each latch bracket is provided with divergent jaws 28, 29 to more readily receive the latch bar 30 when the latch is engaged. The latch lever 31 is formed with a handle 32 intermediate the two journalled ends 33, 34. The journalled end 33 is carried in the latch bracket 17 while the journalled end 34 is carried in the latch bracket 18. Latch element 35 is carried on the journalled end 33 while the latch element 36 is carried on the journalled end 34. A torrison spring 37 is carried on the journalled end 33 which produces a torque against the pin 38 at end 39 of the spring 37. The end 40 also bears against the latch bracket 17 to maintain the torque force on the latch lever 31.

Figure 2:
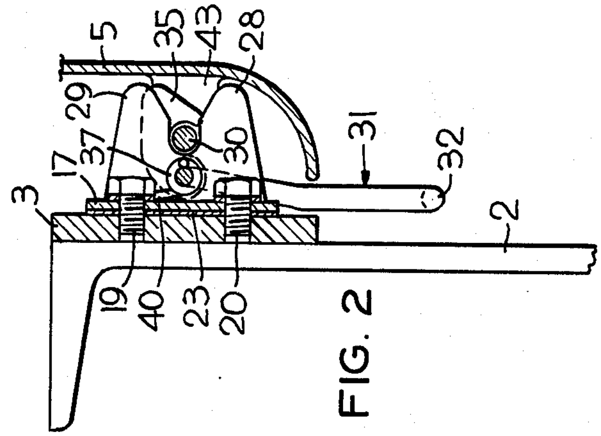
FIG. 2 is an end view of the latching mechanism and the side panel.

Latch bars 30, 41 are mounted on the side panel 5. Referring to FIGS. 2 and 3, the latch bar 30 is carried on the abutment 42, 43 of the side panel 5. The latch bar 41 is carried on the abutments 44, 45. The latch bars are fastened by means of the bolts 46. The latch elements 35 and 36 form hook configurations which extends around the latch bars 30, 41 when the latch is engaged.

The operation of the device will be described in the following paragraph.

The side panel 5 is carried on the brackets 7, 8, 107, 108 which form hooks received in slots 109 of the hanger structure 6. The panel can pivot on these brackets to allow the panel to swing outwardly from the engine. The panel can also be lifted to lift the hooks out of the slots in the hanger structure 6. Normally, the panel hangs on the hanger structure 6 and is pulled downwardly and against the supporting structure on the side of the panel by the rear latch 50 as well as the front latch 51. To align the front end of the side panel 5, the grille 4 can be pivoted about the bolt 15 in the grille bracket 9 and locked in position by a bolt in the slot 16. Fore and aft movement of the side panel 5 is accomplished through slots 11 and 12 in the bracket 10 which is supported on the chassis through bracket 13. This allows a movement of the panel 5 relative to the chassis 1. To accommodate this movement, the latch 51 has a latch element 35 which engages the latch bar 30 and the latch element 36 which engages latch bar 41. Since there is adequate length of the latch bar, any relative movement between the chassis and the panel is accommodated by the latch mechanism since it can be positioned anywhere along the bars 30 and 41. Any transverse movement to adjust the latch can be accommodated by varying the shim thickness of the shims 23. Vertical adjustments of the latches 17, 18 can be made through the slots 24, 25, 26, 27. Once the panel is mounted on the vehicle in proper alignment, the latch can be adjusted to accommodate any position of the panel to assure reliable operation.

The embodiments of this invention in which an exclusive property or privilege is claimed are defined as follows:

1. An engine hood having a side panel and latch comprising, a vehicle chassis, a vertically oriented side panel adjustably suspended by its upper edge on said vehicle chassis to pivot to and from a latched position, a side panel latching device adjustably mounted on said vehicle chassis for latching said side panel, said latching device including a latch bar mounted on the inside of said side panel, latch support bracket means mounted on said vehicle chassis, a latch lever including an integral bifurcated member having an intermediate portion defining a handle pivotally mounted by coaxially aligned journalled ends on said latch support bracket means, said handle extending downwardly through a slot in said panel for releasing said latch device, resilient means normally biasing said latch lever to a latching position, a latch element on said latch lever defining a cam surface for engaging said latch bar and biasing said latch lever against the force of said resilient means to allow latching of said latching device when said side panel is pivoted to its normally latched position.

2. An engine hood having a side panel and latch as set forth in claim 1 wherein said latch lever defines a bifurcated member pivotally supported on each end in a bracket of said latch support bracket means.

3. An engine hood having a side panel and latch as set forth in claim 1 wherein said latch lever defines an integral bifurcated member pivotally supported on either end with a handle in the center portion of said lever.

4. An engine hood having a side panel and latch as set forth in claim 1 wherein said latch lever defines a latch element on each end of said latch lever for latching said panel.

5. An engine hood having a side panel and latch as set forth in claim 1 including adjustable means to adjustably position said side panel fore and aft relative to said chassis, said latch bar on said panel having a latching portion extending longitudinally to accommodate adjustment of said panel relative to said chassis.

6. An engine hood having a side panel and latch as set forth in claim 1 wherein said latch support bracket means includes means vertically adjusting the bracket means relative to said vehicle chassis to assure alignment between the latch element and said latch bar.

7. An engine hood having a side panel and latch as set forth in claim 1 including means to adjustably position said panel fore and aft, said latch bar axially spaced fore and aft to accommodate adjustment of said panel relative to said chassis to assure positive latching of said panel to said latching device.

8. An engine hood having a side panel and latch as set forth in claim 1 wherein said latch support bracket means defines two sections each pivotally supporting an end of said latch lever, means defining jaws on each of said latch support brackets means forming divergent openings to assist aligning said latch bar in said jaws when latching said panel.

9. An engine hood having a side panel and latch as set forth in claim 1 wherein said latch support bracket means defines divergent jaws for receiving said latch bar, said latch element defines a hook engaging the latch bar to maintain the latch bar in a locked position in the jaws of said latch support bracket means.

* * * * *